US009683852B2

(12) United States Patent
Dong et al.

(10) Patent No.: US 9,683,852 B2
(45) Date of Patent: Jun. 20, 2017

(54) DISPATCHING MAP MATCHING TASKS BY A CLUSTER SERVER

(71) Applicant: International Business Machines Corporation, Armonk, NY (US)

(72) Inventors: Wei Shan Dong, Beijing (CN); Ning Duan, Beijing (CN); Peng Gao, Beijing (CN); Baohua Wang, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/542,059

(22) Filed: Nov. 14, 2014

(65) Prior Publication Data

US 2015/0153187 A1   Jun. 4, 2015

(30) Foreign Application Priority Data

Nov. 29, 2013 (CN) .......................... 2013 1 0629751

(51) Int. Cl.
G01C 21/00 (2006.01)
G01C 21/30 (2006.01)
G01C 21/26 (2006.01)

(52) U.S. Cl.
CPC ............ *G01C 21/30* (2013.01); *G01C 21/26* (2013.01)

(58) Field of Classification Search
CPC ................................ G01C 21/30; G01C 21/26
(Continued)

(56) References Cited

U.S. PATENT DOCUMENTS 8,918,282 B1 * 12/2014 Stenneth ............. G08G 1/0112
                                                      701/117
2006/0095917 A1   5/2006 Black-Ziegelbein et al.
(Continued)

FOREIGN PATENT DOCUMENTS

CN   1969171 A    5/2007
CN   101452259 A  6/2009
(Continued)

OTHER PUBLICATIONS

Anonymous, "Method to synchronize GPS positions between two or more devices with navigation aids", IP.com Prior Art Database Technical Disclosure, IP.com No. 000216340, Mar. 31, 2012. http://null/IPCOM/000216340.
(Continued)

*Primary Examiner* — Redhwan k Mawari
*Assistant Examiner* — Rodney P King
(74) *Attorney, Agent, or Firm* — Jared L. Montanaro

(57) ABSTRACT

There is disclosed a method, comprising: determining a road segment group set that corresponds to a current time period, and a correspondence relationship between each road segment group in the road segment group set and a computing node of the cluster server, wherein the road segment group is a group of road segments which are grouped according to the number of computing nodes of the cluster server and the dissimilarity between divided road segments in a road network; in response to receiving multiple GPS sampled data from a vehicle, generating a map matching request according to the multiple GPS sampled data; and in response to generating a map matching request and obtaining a road segment to which the latest location of the vehicle belongs, sending the map matching request to a computing node that corresponds to a road segment group to which the obtained road segment belongs.

20 Claims, 5 Drawing Sheets

(58) Field of Classification Search
USPC .................................................. 701/446
See application file for complete search history.

(56) References Cited

U.S. PATENT DOCUMENTS

| | | | |
|---|---|---|---|
| 2007/0208493 A1 | 9/2007 | Downs et al. | |
| 2010/0114466 A1* | 5/2010 | Tomita | G01C 21/3492 701/118 |
| 2011/0208426 A1* | 8/2011 | Zheng | G01C 21/30 701/532 |
| 2013/0204528 A1* | 8/2013 | Okude | G08G 1/096822 701/533 |

FOREIGN PATENT DOCUMENTS

| | | |
|---|---|---|
| CN | 103036927 A | 4/2013 |
| EP | 1286138 A2 | 2/2003 |
| EP | 2624235 A2 | 8/2013 |
| WO | 2012078755 A2 | 6/2012 |
| WO | 2013117723 A1 | 8/2013 |

OTHER PUBLICATIONS

CN Application 201310629751.5, entitled "Dispatching Map Matching Tasks by Cluster Server in Internet of Vehicles", filed Nov. 29, 2013.
PCT Application PCT/CN2014/088406, entitled "Dispatching Map Matching Tasks by Cluster Server in Internet of Vehicles", filed Oct. 11, 2014.
Anonymous, "MatchBox Map Matching Software and Tools", Nottingham Scientific Ltd., Copyright © 2010. http://www.nsl.eu.com/matchbox.html#.
Anonymous, "Technologies Overview", CloudMade. http://cloudmade.com/technologies/overview.
Mell et al., "The NIST Definition of Cloud Computing," National Institute of Standards and Technology, U.S Department of Commerce, Special Publication 800-145, Sep. 2011.
International Search Report dated Jan. 8, 2015 for International Application PCT/CN2014/088406, 9 pgs.

* cited by examiner

DISPATCHING MAP MATCHING TASKS BY A CLUSTER SERVER

CROSS REFERENCE TO RELATED APPLICATION

This application claims priority to Chinese Patent Application No. 201310629751.5, filed Nov. 29, 2013, which is incorporated herein in its entirety.

BACKGROUND

The present disclosure relates to map matching in the Internet of Vehicles, and more specifically, to a method and apparatus for dispatching a map matching task at a cluster server in the Internet of Vehicles.

With the advent of the Internet of Vehicles era, it will become a trend and finally come true to provide real-time location-based services (LBS). A prerequisite of providing location-based service is to accurately position real-time locations of vehicles on road segments. Due to drift of GPS signals, city road conditions complexity (e.g. complex overpasses) and other factors, map matching technology is desired, which is a critical technology for accurately positioning real-time locations of vehicles.

Uniformly providing map matching services for vehicles accessing to the Internet of Vehicles at a server end, can avoid map version discrepancies on different terminal devices, avoid map updating latency, and achieve collaborative matching of cluster vehicles. A high-performance, and load-balanced cluster server is required, in order to provide high-performance and low-latency map matching technology for vehicles.

Existing load balancing technology takes into account the performance of cluster servers, reported computation workloads, response speed, network workloads, geographical locations and other factors, but fails to solve conflicts between map matching requests.

After moving into the multi-core age, it is essential and significant to make full use of parallel computing capabilities of multiple cores so as to enhance the overall computing power of a cluster. In a map matching algorithm, a huge amount of short-distance path searches is one of the main factors consuming computation resources. It is necessary to make sufficient use of parallel computing capabilities of multiple cores so as to handle a large amount of short-distance path searches. When leveraging parallel computing capabilities of multiple cores to implement parallel short-distance path searches, conflicts occur between path search tasks at adjacent geographical locations, then lock queue arises, and finally the overall computing efficiency is degraded. A reason why conflicts occur between path search tasks at adjacent geographical locations is that candidate matching locations of sampling points are usually not original nodes in a road network in GIS data. Therefore, when searching for the shortest path between these candidate locations, temporary nodes have to be added to the road network model. In the meantime, when there is a need to use heuristic search to accelerate the search speed, a large quantity of temporary statuses need to be recorded in midway nodes. These frequent write operations cause a serious conflict problem in parallel computing.

Therefore, these is a need for a method for solving conflicts that occur when computing nodes of a cluster server handle map matching tasks.

SUMMARY

According to one aspect of the present disclosure, there is provided a method for dispatching a map matching task at a cluster server in the Internet of Vehicles, comprising: determining a road segment group set that corresponds to a current time period, and a correspondence relationship between each road segment group in the road segment group set and a computing node of the cluster server. The road segment group is a group of road segments which are grouped according to the number of computing nodes of the cluster server and the dissimilarity between divided road segments in a road network; in response to having received multiple GPS sampled data from a vehicle, generating a map matching request according to the multiple GPS sampled data; and in response to having generated a map matching request and having obtained a road segment to which the latest location of the vehicle belongs, sending the map matching request to a computing node that corresponds to a road segment group to which the obtained road segment belongs, for map matching.

According to another aspect of the present disclosure, there is provided an apparatus for dispatching a map matching task at a cluster server in the Internet of Vehicles, comprising: a determining module configured to determine a road segment group set that corresponds to a current time period, and a correspondence relationship between each road segment group in the road segment group set and a computing node of the cluster server, wherein the road segment group is a group of road segments which are grouped according to the number of computing nodes of the cluster server and the dissimilarity between divided road segments in a road network; a matching request generating module configured to, in response to having received multiple GPS sampled data from a vehicle, generate a map matching request according to the multiple GPS sampled data; and a dispatching module configured to, in response to having generated a map matching request and having obtained a road segment to which the latest location of the vehicle belongs, send the map matching request to a computing node that corresponds to a road segment group to which the obtained road segment belongs, for map matching.

By means of the method and apparatus according to the embodiments of the present disclosure, conflicts that are caused when computing nodes of the cluster server process map matching tasks can be solved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
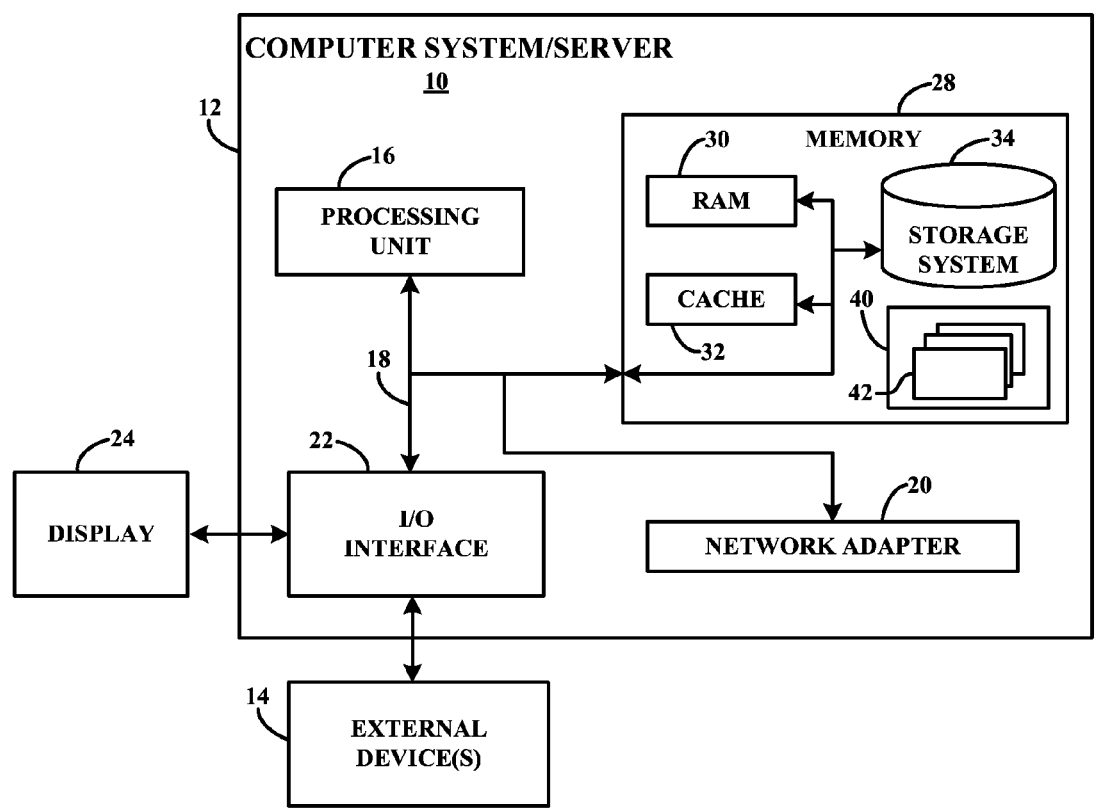
FIG. 1 shows an computer system 12 which is applicable to implement the embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a computer system/server 12 which is applicable to implement the embodiments of the present disclosure. The computer system/server 12 as illustrated in FIG. 1 is only an example, which should not construct any limitation to the functions and application scope of the embodiments of the present disclosure.

As illustrated in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present disclosure.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present disclosure.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
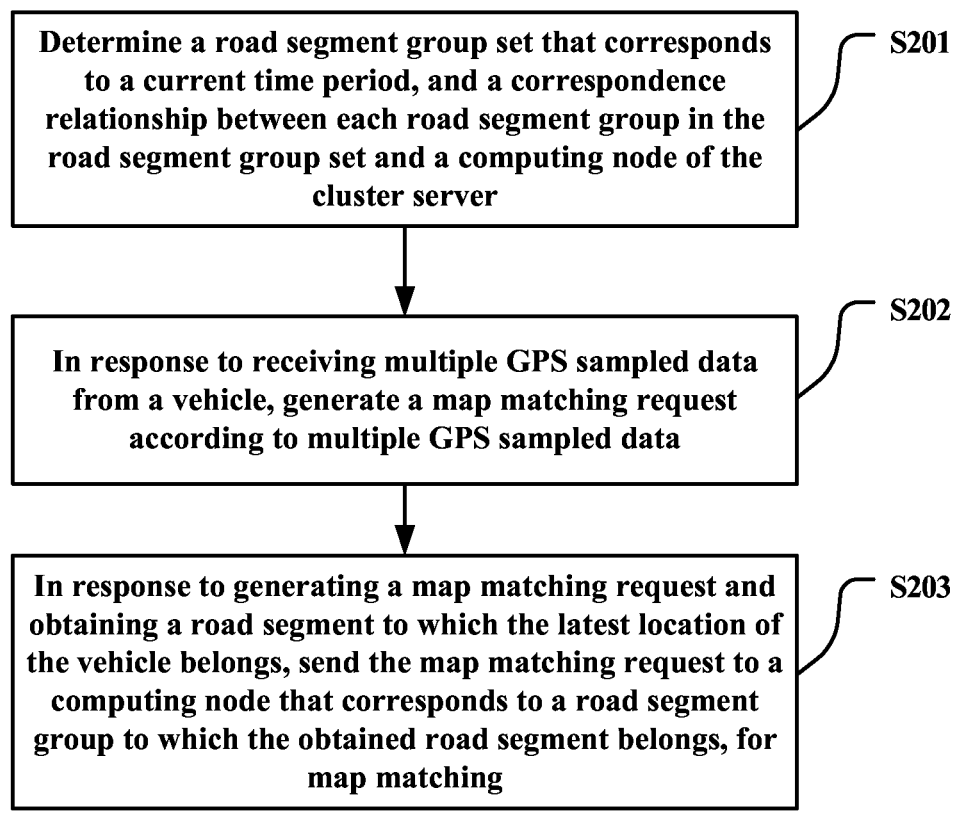
FIG. 2 shows a method for dispatching a map matching task at a cluster server in the Internet of Vehicles according to one embodiment of the present disclosure.

With reference now to FIG. 2, this figure shows a method of dispatching a map matching task at a cluster server in the Internet of Vehicles, the method comprising: in step S201, determining a road segment group set that corresponds to a current time period, a correspondence relationship between each road segment group in the road segment group set, and a computing node of the cluster server. The road segment group is a group of road segments which are grouped according to the number of computing nodes of the cluster server and the dissimilarity between divided road segments on a road network; in step S202, in response to having received multiple GPS sampled data from a vehicle, generating a map matching request according to the multiple GPS sampled data. In step S203, in response to the having generated a map matching request and having obtained a road segment that corresponds to the latest location of the vehicle, sending the map matching request, to a computing node that corresponds to a road segment group to which the obtained road segment belongs, for map matching.

Before step S201, the road network in the Internet of Vehicles needs to be pre-processed; time periods may be divided according to historical road condition information, such that the average vehicle density of the road network in each time period changes smoothly. Next, with respect to a certain time period, road segments in the road network are divided. The road segment in an Internet of Vehicles map refers to a minimum unit for defining the road network in an Internet of Vehicles map file. Those skilled in the art may understand that road segments in the road network may be divided using a method for dividing road segments in the prior art. According to the embodiment of the present disclosure, road segments in the road network are divided according to historical road network information, such as the number of vehicles in each resulting road segment is close to average.

According to the embodiment of the present disclosure, the dividing road segments in the road network according to historical road condition information further comprises: making statistics on the number of vehicles in a road segment in the road network in a certain time period, and the total number of vehicles in the road network in the time period, specifically, the number of vehicles in a road segment in the road network in the certain time period, and the total number of vehicles in the road network in the time period may be obtained from a historical traffic monitoring data of a public information platform. The calculating a road segment average vehicle number in the time period according to the total number of vehicles in the road network, and the number of road segments; and dividing the road segment in the road network according to the number of vehicles in the road segment in the road network in the time period and the road segment average vehicle number in the time period.

Figure 3:
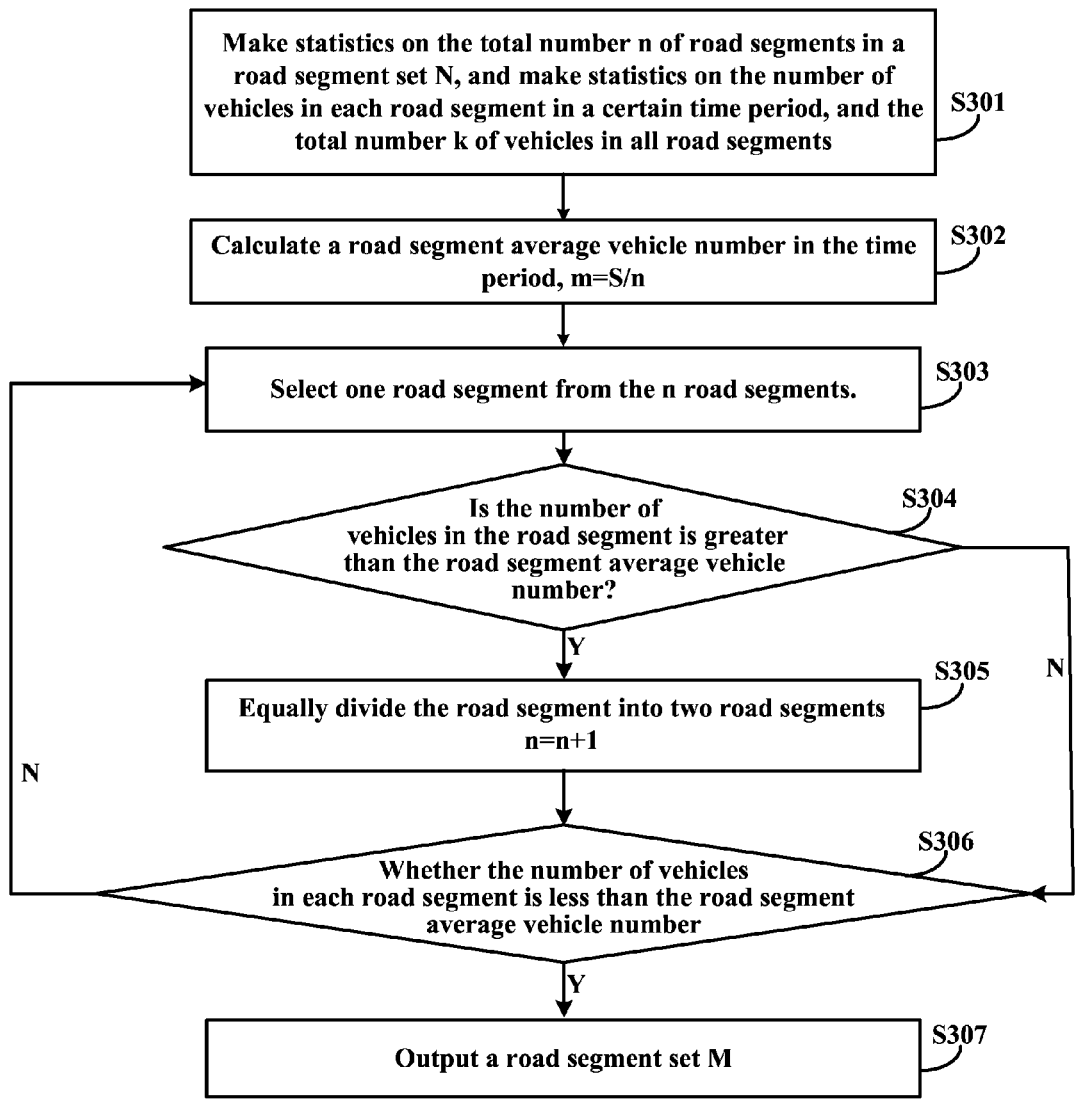
FIG. 3 shows a flowchart of dividing road segments by using a recursive equal division method according to one embodiment of the present disclosure.

According to the embodiment of the present disclosure, the dividing the road segment in the road network according to the number of vehicles in the road segment in the road network in the time period and the road segment average vehicle number in the time period comprises: judging whether the number of vehicles in a certain road segment in a certain time period is not less than the road segment average vehicle number or not; in response to the decision result being not, equally dividing the certain road segment into two road segments; iteratively executing the decision step until the number of vehicles in each road segment is less than the road segment average vehicle number. FIG. 3 shows a flowchart of dividing road segments by using a recursive equal division method according to one embodiment of the present disclosure. In step S301, statistics are made on the total number n of road segments in a road segment set N of a road network, statistics is made on the number $s_i$ (i=1 ... n) of vehicles in each segment in a certain time period according to historical road condition information, and the total number of vehicles in all road segments in the time period S is calculated by the summation below. In step S302, a road segment average vehicle number S/n of in the time period is calculated. In step S303, one segment is selected from the n road segments. In step S304, a decision is made as to whether the number of vehicles in the road segment is greater than the road segment average vehicle number or not. If the decision result is yes, then in step S305 the road segment is equally divided into two road segments. If the decision result is no, then the flow proceeds to step S306 where decision is made as to whether the number of vehicles in each road segment is less than the road segment average vehicle number. If the decision result is yes, then in step S307 a road segment set M is outputted. If the decision result is no, then the flow returns to step S303 and repeats steps S303 to S306 until the number of vehicles in each road segment is less than the road segment average vehicle number.

$$\text{(summation) } S = \sum_{i=1}^{n} s_i$$

Figure 4:
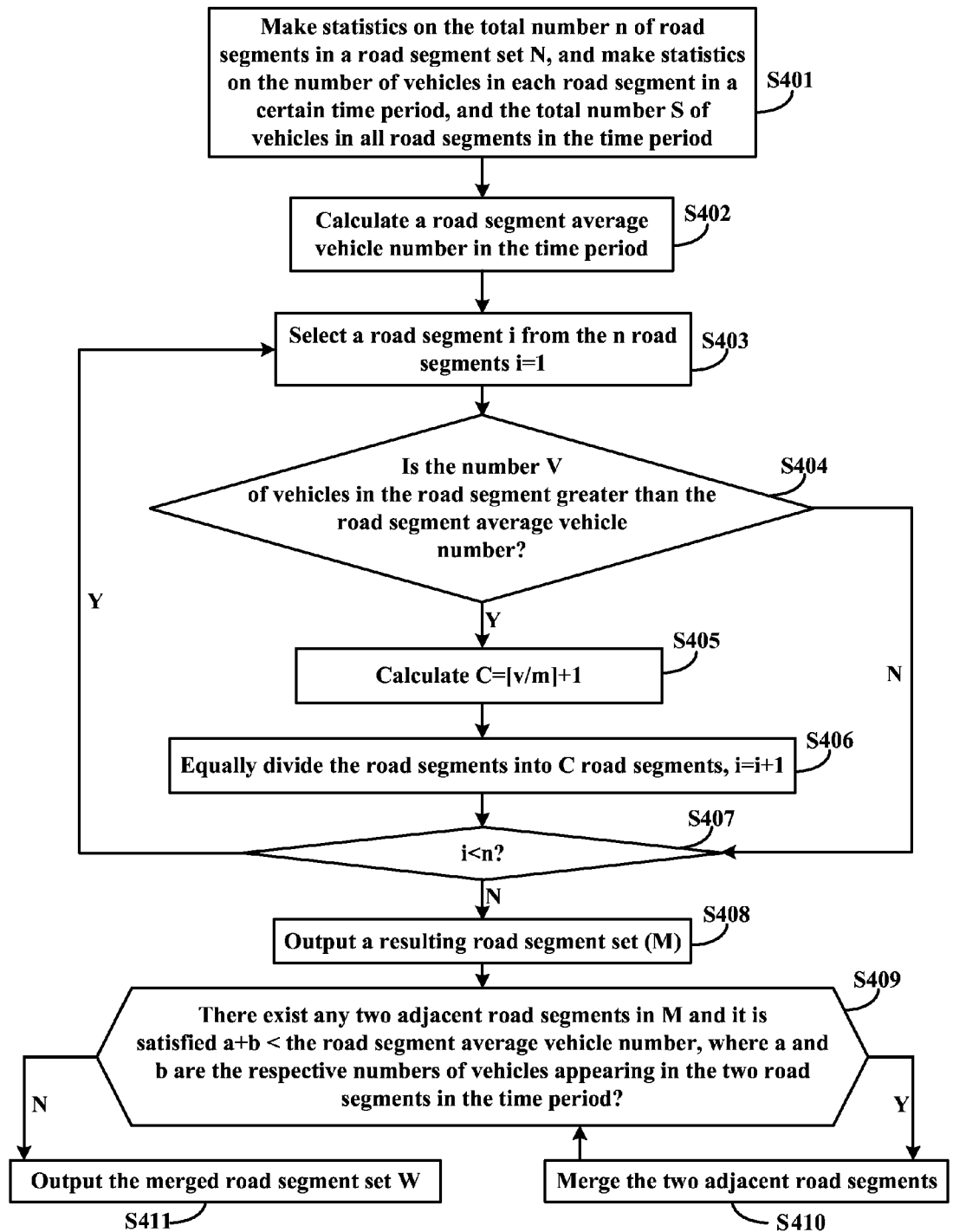
FIG. 4 shows a flowchart of dividing road segments according to another embodiment of the present disclosure.

FIG. 4 shows a flowchart of dividing road segments according to another embodiment of the present disclosure. In step S401, statistics are made on the total number n of road segments in a road segment set N in a road network, the number $s_i$ (i=1 . . . n) of vehicles v in each segment in a certain time period according to historical road condition information, and the total number S of vehicles in all road segments in the time period. In step S402, a road segment average vehicle number S/n in the time period is calculated. In step S403, one segment i is selected from the n road segments, where i=1. In step S404, decision is made as to whether the number v of vehicles in the road segment is greater than the road segment average vehicle number or not. If the decision result is yes, then in step S405 C=[v/m]+1 is calculated, v/m is then rounded down. If the decision result is no, then in step S406 the road segment is divided into C road segments, where i=i+1. In step S407, decision is made as to whether i is less than n. If the decision result is yes, then the flow proceeds to step S403. If the decision result is no, then in step S408 a resulting road segment set M is outputted. In step S409, decision is made as to whether there exist any two adjacent road segments and it is satisfied a+b<the road segment average vehicle number, where a and b are the respective numbers of vehicles appearing in the two road segments in the time period. If the decision result is yes, then in step S410 the two adjacent road segments are merged. If the decision result is no, then in step S411 a resulting road segment set W is outputted.

Divided road segments are grouped according to the number of computing nodes of map matching of the cluster server and the dissimilarity between the divided road segments, such that the number of road segments in each group is close to each other, and the dissimilarity between every two road segments in a group is as high as possible, whereby a road segment group set corresponding to each time period is formed.

The dissimilarity can distinguish the following three circumstances of any two road segments in the each road segment group, such that the dissimilarity between any two road segments in the each road segment group is as high as possible: two road segments are far away from each other, i.e. it is satisfied that the distance between any two points of the two road segments is more than 2δ (δ is the maximum distance offset error of sampled data); two road segments intersect; two road segments are approximately parallel.

According to the embodiment of the present disclosure, suppose a road segment set V=($v_1$, $v_2$, $v_3$ . . . $v_n$), and the number of computing nodes of the cluster server implementing map matching is N. Road segments in V are divided into N groups, and it is satisfied that the dissimilarity between every two road segments in each group is as high as possible, so that the possibility of the occurrence of task conflicts when computing nodes search for the shortest path of map matching is as low as possible.

According to the embodiment of the present disclosure, it is defined the dissimilarity $Dsim(v_i,v_j)$ between any two road segments $v_i$ and $v_j$ in S is:

$$Dsim(v_i, v_j) = \begin{cases} M, & \text{when } F(v_i, v_j) > \delta, \text{ and there is no intersection between } v_i \text{ and } v_j \\ m, & \text{when } F(v_i, v_j) > \delta, \text{ and there is more than one intersection between } v_i \text{ and } v_j \\ \dfrac{1}{F(v_i, v_j)}, & \text{when } F(v_i, v_j) \leq \delta \end{cases}$$

Where both M and m are constants greater than 1, and M>m;

δ is the maximum distance offset error of GPS sampled data;

F(A, B) is a method of calculating Fréchet distance that is widely used for calculating the similarity between two curves, $$F(A, B) = \inf_{\alpha, \beta} \max_{t \in [0,1]} \{d(A(\alpha(t)), B(\beta(t)))\}$$

Let S be a continuous two-dimensional space, wherein each curve may be regarded as a continuous map function of a series of points from [0,1] to S. Let A(x) and B(x) be two curves in S, x∈[0,1]. And let α(t),β(t) each be a monotonic, continuous, non-decreasing map function from [0,1] to [0,1], t∈[0,1]. Then, the Fréchet distance of curve A(x) and curve B(x) may be defined as the lower bound of the maximum distance between two curves calculated by all possible mapping relationships α(t),β(t).

Build an optimization model of road segment grouping, satisfy the number of road segments in each group is as average as possible, and the sum of dissimilarity between any two road segments in each group is as large as possible.

$$\max \sum_{j \in N} \sum_{k \in Pair(S)} x_{jo_k} x_{jd_k} Dsim(o_k, d_k)$$

$$\min \sum_{k \in Pair(N)} \left| \sum_{i \in S} - \sum_{i \in S} x_{d_k i} \right|$$

Parameters in the optimization model are defined as below:

S—road segment set, i is an index.

N—computing node set, j is an index.

Dsim(i,i')—dissimilarity function between road segment i and road segment i'.

Pair(.)—set of all sets with a size of 2 in a power set of a given set, k is an index.

$o_k$—first element in the power set.

$d_k$—second element in the power set.

$x_{ji}$—variable between 0 and 1, if road segment i is calculated on computing node j, then $x_{ji}=1$; otherwise $x_{ji}=0$.

Where decision variable $x_{ji}$ may be calculated using various optimization algorithms, including greedy algorithms, K-Means, simulated annealing, genetic algorithms, tabu search, etc., which are not detailed here. Those skilled in the art should understand optimization algorithms capable of obtaining the decision variable all fall within the scope of the present disclosure.

A road segment group set of each time period is obtained according to the above optimization algorithm, each road segment group in the road segment group set is randomly dispatched to one computing node in the cluster server, a correspondence relationship between each road segment group and the computing node is recorded. A map matching task associated with multiple road segments in each road segment group is dispatched to a corresponding computing node for processing. Before dispatching map matching tasks in real time, it is necessary to determine a road segment group set corresponding to a current time period and a correspondence relationship between each road segment group in the road segment group set and a computing node of the cluster server.

In step S202, in response to having received multiple GPS sampled data from a vehicle, a map matching request is generated according to the multiple GPS sampled data. While traveling, the vehicle sends GPS sampling point data to a dispatch node of the cluster server, and a road network matching request is generated at the dispatch node according to multiple time-consecutive GPS sampling point data.

According to the embodiment of the present disclosure, the order between steps S201 and S202 may change, i.e. step S201 may be executed after step S202.

In step S203, in response to having generated a map matching request and having obtained a road segment to which the latest location of the vehicle belongs, the map matching request is sent to a computing node that corresponds to a road segment group to which the obtained road segment belongs, for map matching.

According to the embodiment of the present disclosure, in response to having generated a map matching request and not having obtained a road segment of the latest location of the vehicle, sending the map matching request to a random computing node for processing. Specifically, if a computing node has performed map matching to GPS sampled data of the vehicle, then a road segment of the latest location of the vehicle is sent to the dispatch node where road segment information corresponding to the latest location of the vehicle is recorded. If a map matching request of the vehicle is generated and a road segment of the latest location of the vehicle is found, then the map matching request is sent to a computing node corresponding to the obtained road segment for processing. If no computing node has performed map matching to GPS sampled data of the vehicle, then at the dispatch node there is no record of road segment information to which the latest location of the vehicle belongs. If a map matching request of the vehicle is generated and a road segment to which the latest location of the vehicle belongs is not found, then the map matching request is sent to a random computing node for processing.

According to one embodiment of the present disclosure, the dispatch node receives multiple GPS sampling point data of a vehicle with an ID of XYZ001. Table 1 shows information contained in a road network matching request that is generated according to GPS sampling point data; Table 2 shows a record of the vehicle's latest location according to the embodiment of the present disclosure, whereby it is learned that the vehicle's latest location is on road segment 5; further, computing node 2 corresponds to road segment 5 and that is found in Table 3. Therefore, the vehicle's road network matching request is sent to computing node 2 for map matching.

TABLE 1

Information Contained in Road Network Matching Request According to the Embodiment of the Present Disclosure

| Vehicle ID | X1 Longitude | Y1 Latitude | Time |
|---|---|---|---|
| XYZ001 | 87.436 | 45.795 | 2003-11-10 10:31:31 |
| XYZ001 | 87.434 | 45.795 | 2003-11-10 10:32:01 |
| XYZ001 | 87.431 | 45.795 | 2003-11-10 10:32:31 |

TABLE 2

Vehicle's Latest Location Information According to the Embodiment of the Present Disclosure

| Vehicle ID | Latest Location |
|---|---|
| XYZ001 | road segment 5 |

TABLE 3

Correspondence Relationship Between Road Segment Group and Computing Node According to the Embodiment of the Present Disclosure

| Road Segment Group | Road Segment | Computing Node |
|---|---|---|
| group 1 | road segments 1, 3, 7 | node 1 |
| group 2 | road segments 2, 5, 8 | node 2 |
| group 3 | road segments 4, 6, 9 | node 3 |

Description has been presented above to the various embodiments implementing the method of the present disclosure with reference to the accompanying drawings. Those skilled in the art may understand that the method may be implemented in software, hardware, or a combination of software and hardware. Moreover, those skilled in the art may understand that by performing the various steps in the method as in software, hardware or combination of software and hardware, an apparatus for dispatching a map matching task at a cluster server in the Internet of Vehicles may be provided. Even though the apparatus has the same hardware structure as a general-purpose processing device, the functionality of software contained therein makes the apparatus manifest distinguishing properties from the general-purpose processing device, thereby forming an apparatus of the various embodiments of the present invention.

Figure 5:
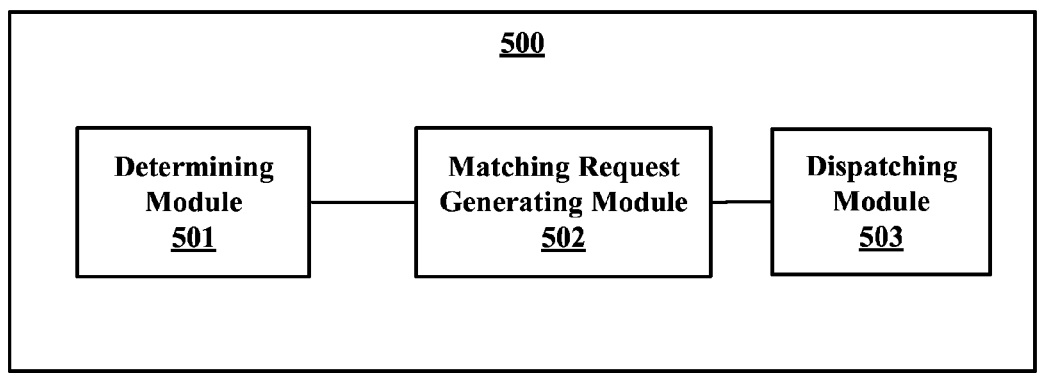
FIG. 5 shows an apparatus 500 for dispatching a map matching task at a cluster server in the Internet of Vehicles according to one embodiment of the present disclosure.

With reference to FIG. 5, description is presented below to an apparatus 500 for dispatching a map matching task at a cluster server in the Internet of Vehicles according to the embodiment of the present disclosure. Apparatus 500 comprises an apparatus for dispatching a map matching task at a cluster server in the Internet of Vehicles, comprising: a determining module 501 (a type of programming module) configured to determine a road segment group set that corresponds to a current time period, and a correspondence relationship between each road segment group in the road segment group set and a computing node of the cluster server, wherein the road segment group is a group of road segments which are grouped according to the number of computing nodes of the cluster server and the dissimilarity between divided road segments on a road network; a matching request generating module 502 (a type of programming module) configured to, in response to receiving multiple GPS sampled data from a vehicle, generate a map matching request, according to the multiple GPS sampled data from the vehicle; and a dispatching module 503 (a type of programming module) configured to, in response to having generated a map matching request and having recorded a road segment that corresponds to the latest location of the vehicle, send the map matching request to a computing node that corresponds to a road segment group to which the obtained road segment belongs, for map matching.

According to the embodiment of the present disclosure, the divided road segments result from dividing road segments in the road network according to historical road condition information, such that the number of vehicles in each divided road segment is close to average.

According to the embodiment of the present disclosure, the dividing of the road segments in the road network according to historical road condition information comprises: making statistics on the number of vehicles in a road segment in the road network in a certain time period, and the total number of vehicles in the road network in the time period; calculating a road segment average vehicle number in the time period according to the total number of vehicles in the road network and the number of road segments; and dividing the road segment in the road network according to the number of vehicles in the road segment in the road network in the time period and the road segment average vehicle number in the time period.

According to the embodiment of the present disclosure, the dividing the road segment in the road network according to the number of vehicles in the road segment in the road network in the time period, and the road segment average vehicle number in the time period comprises: judging whether the number of vehicles in a certain road segment in a certain time period is not less than the road segment average vehicle number or not; in response to the decision result being not, equally dividing the certain road segment into two road segments; iteratively executing the decision step until the number of vehicles in each road segment is less than the road segment average vehicle number.

According to the embodiment of the present disclosure, the dissimilarity can distinguish the following three circumstances of any two road segments in the each road segment group, such that the dissimilarity between any two road segments in the each road segment group is as high as possible. Two road segments are far away from each other, i.e. it is satisfied that the distance between any two points of two road segments is more than 2δ (δ is the maximum distance offset error of sampled data); two road segments intersect; two road segments are approximately parallel.

According to the embodiment of the present disclosure, the dispatching module 504 is further configured to: in response to having generated a map matching request and not having recorded a road segment corresponding to the latest location of the vehicle, send the map matching request to a random computing node for processing.

A concrete implementing method of each of the above modules may refer to the detailed description of the method for dispatching a map matching task at a cluster server in the Internet of Vehicles according to the embodiment of the present disclosure, which is not detailed here.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dispatching a map matching task at a cluster server in the Internet of Vehicles, comprising:
   determining, by one or more processors, a road segment group set that corresponds to a time period;
   determining, by the one or more processors, a correspondence relationship between each road segment group in the road segment group set and a computing node of the cluster server, wherein road segments in the road segment group are grouped according to a number of computing nodes in the cluster server and dissimilarity between divided road segments on a road network, wherein the dissimilarity between divided road segments is based, at least in part, on whether any two road segments intersect;
   monitoring, by the one or more processors, multiple GPS (global positioning system) sampled data from a vehicle that indicates a road segment;
   generating, by the one or more processors, in response to having received multiple GPS sampled data from the vehicle, a map matching request according to the multiple GPS sampled data; and
   sending, by the one or more processors, in response to generating the map matching request and not obtaining a road segment from the multiple GPS sampled data the map matching request to a random computing node.

2. The method according to claim 1, wherein the divided road segments result from dividing road segments in the road network according to historical road condition information.

3. The method according to claim 2, wherein the number of vehicles in each divided road segment is close to average.

4. The method according to claim 2, wherein the dividing road segments in the road network according to historical road condition information comprises:
   determining a number of vehicles in a road segment in the road network in the time period, the number of road segments in the road segment set of the road network, and the total number of vehicles in the road network in the time period;

calculating a road segment average vehicle number in the time period according to the total number of vehicles in the road network and the number of road segments; and dividing the road segment in the road network according to the number of vehicles in the road segment in the road network in the time period and the road segment average vehicle number in the time period.

5. The method according to claim 4, wherein the dividing the road segment in the road network according to the number of vehicles in the road segment in the road network in the time period and the road segment average vehicle number in the time period comprises:

determining whether a number of vehicles in a certain road segment in a certain time period is not less than the road segment average vehicle number; and dividing, equally, in response to the number of vehicles in the certain road segment being not less than the road segment average vehicle number, the certain road segment into two road segments.

6. The method according to claim 1, wherein determining the dissimilarity comprises:

determining the dissimilarity between any two road segments in the each road segment group as high based on determining that the Fréchet distance between the two road segments is greater than the maximum distance offset error of the GPS sampled data.

7. The method according to claim 1, further comprising:

sending, by the one or more processors, in response to generating the map matching request and obtaining a road segment from the multiple GPS sampled data, the map matching request to a computing node that corresponds to the road segment group to which an obtained road segment belongs.

8. An apparatus for dispatching a map matching task at a cluster server in an Internet of Vehicles, comprising:

a memory;

a processor device communicatively coupled to the memory; and a determining module communicatively coupled to the memory and the processor device, wherein the determining module is configured to:

determine a road segment group set that corresponds to a time period, and determine a correspondence relationship between each road segment group in the road segment group set and a computing node in the cluster server, wherein road segments in the road segment group are grouped according to a number of computing nodes in the cluster server and dissimilarity between divided road segments on a road network, wherein the dissimilarity between divided road segments is based on at least whether any two road segments are parallel;

a matching request generating module configured to:

monitor multiple GPS(global positioning system) sampled data from a vehicle that indicates a road segment, and generate, in response to having received multiple GPS sampled data from the vehicle, a map matching request according to the multiple GPS sampled data; and a dispatching module configured to:

send, in response to generating the map matching request and not obtaining a road segment from the multiple GPS sampled data the map matching request to a random computing node.

9. The apparatus according to claim 8, wherein the divided road segments result from dividing road segments in the road network according to historical road condition information.

10. The apparatus according to claim 9, wherein the number of vehicles in each divided road segment is close to average.

11. The apparatus according to claim 9, wherein the dividing road segments in the road network according to historical road condition information comprises:

determining a number of vehicles in a road segment in the road network in the time period, the number of road segments in the road segment set of the road network, and a total number of vehicles in the road network in the time period;

calculating a road segment average vehicle number in the time period according to the total number of vehicles in the road network and the number of road segments; and dividing the road segment in the road network according to the number of vehicles in the road segment in the road network in the time period and the road segment average vehicle number in the time period.

12. The apparatus according to claim 11, wherein the dividing the road segment in the road network according to the number of vehicles in the road segment in the road network in the time period and the road segment average vehicle number in the time period comprises:

determining whether a number of vehicles in a certain road segment in a certain time period is greater than the road segment average vehicle number; and dividing, equally, in response to the number of vehicles in the certain road segment being greater than the road segment average vehicle number, the certain road segment into two road segments.

13. The apparatus according to claim 8, wherein the determining module is configured to determine the dissimilarity by: determining the dissimilarity between any two road segments in the each road segment group as high based on determining that the Fréchet distance between the two road segments is greater than the maximum distance offset error of the GPS sampled data.

14. The apparatus according to claim 8, wherein the dispatching module is configured to send, in response to generating the map matching request and not obtaining a road segment from the multiple GPS sampled data, the map matching request to a random computing node.

15. The apparatus according to claim 8, wherein the dispatching module is further configured to:

send, in response to generating the map matching request and obtaining a road segment from the multiple GPS sampled data, the map matching request to a computing node that corresponds to the road segment group to which an obtained road segment belongs.

16. A computer program product for dispatching a map matching task at a cluster server in an Internet of Vehicles, the computer program product comprising a computer readable storage medium having program code embodied therewith, the program code readable by one or more processors to cause the one or more processors to:

determine a road segment group set that corresponds to a time period;

determine a correspondence relationship between each road segment group in the road segment group set and a computing node in the cluster server, wherein road segments in the road segment group are grouped according to a number of computing nodes in the cluster server and dissimilarity between divided road segments on a road network, wherein the dissimilarity between divided road segments is based on at least whether any two road segments intersect;

monitor multiple GPS (global positioning system) sampled data from a vehicle that indicates a road segment;

generate, in response to having received multiple GPS sampled data from the vehicle, a map matching request according to the multiple GPS sampled data; and send, in response to generating the map matching request and not obtaining a road segment from the multiple GPS sampled data the map matching request to a random computing node.

17. The computer program product according to claim 16, wherein the divided road segments result from dividing road segments in the road network according to historical road condition information.

18. The computer program product according to claim 17, wherein the number of vehicles in each divided road segment is close to average.

19. The computer program product according to claim 17, wherein the dividing road segments in the road network according to historical road condition information comprises:

determining a number of vehicles in a road segment in the road network in the time period, the number of road segments in the road segment set of the road network, and a total number of vehicles in the road network in the time period;

calculating a road segment average vehicle number in the time period according to the total number of vehicles in the road network and the number of road segments; and dividing the road segment in the road network according to the number of vehicles in the road segment in the road network in the time period and the road segment average vehicle number in the time period.

20. The computer program product according to claim 16, further comprising the program code readable by the one or more processors to cause the one or more processors to:

send, in response to generating the map matching request and obtaining a road segment from the multiple GPS sampled data, the map matching request to a computing node that corresponds to the road segment group to which the obtained road segment belongs.

\* \* \* \* \*